Feb. 17, 1953            R. STEVENSON            2,628,635
HYDRAULICALLY ACTUATED SUPPLY AND EXHAUST VALVE SYSTEM
Filed June 17, 1946            2 SHEETS—SHEET 1
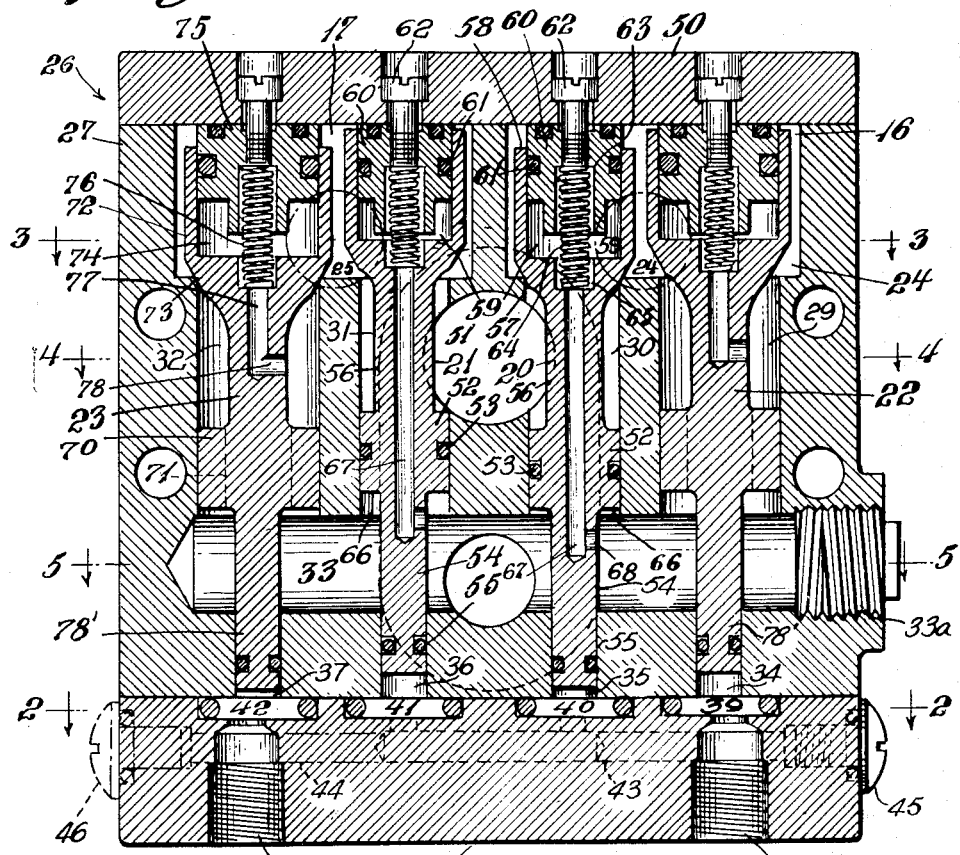
Fig. 1.
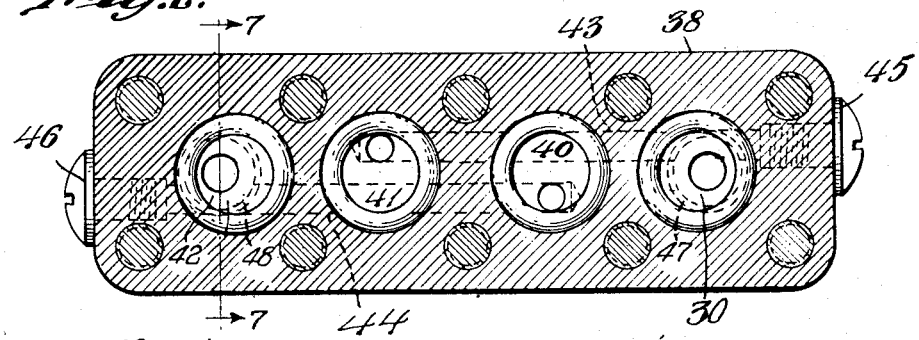
Fig. 2.
Fig. 7.
INVENTOR.
Robert Stevenson
BY Barlow & Barlow
ATTORNEYS Feb. 17, 1953  R. STEVENSON  2,628,635
HYDRAULICALLY ACTUATED SUPPLY AND EXHAUST VALVE SYSTEM
Filed June 17, 1946  2 SHEETS—SHEET 2

INVENTOR.
Robert Stevenson
BY Barlow & Barlow
ATTORNEYS.

Patented Feb. 17, 1953

2,628,635

UNITED STATES PATENT OFFICE 2,628,635

HYDRAULICALLY ACTUATED SUPPLY AND EXHAUST VALVE SYSTEM

Robert Stevenson, Barrington, R. I., assignor to Merit Engineering, Inc., a corporation of Rhode Island Application June 17, 1946, Serial No. 677,372

3 Claims. (Cl. 137—622)

This invention relates to a multiple conduit valve for controlling the direction of flow of fluid to a piston in a cylinder for the control of the operation of some device.

Heretofore, the movement of valves which operate in a liquid medium required considerable force to move the valves from one position to another, especially if multiple valves are operated at the same time.

One of the objects of this invention is to provide an arrangement so that movement of the valves may be had with the exercise of less force.

Another object of this invention is to provide an arrangement so that where two valves are utilized one for the control of supply fluid and the other for the control of return fluid, the valve which controls the return fluid will be prevented from interfering with the action of the valve for controlling of the supply fluid.

More specifically an object of this invention is to arrange so that the return fluid valve will operate just prior to the operation of the pressure valve so that no back pressure will be built up to affect the operation of the pressure valve.

With these and other objects in view, the invention consists of certain novel features of construction, as will be more fully described and particularly pointed out in the appended claims.

In the accompanying drawings:

Fig. 1 is a sectional view through substantially the center of a multiple valve;

Fig. 2 is a section on line 2—2 of Fig. 1;

Fig. 7 is a section view taken substantially along line 7—7 of Fig. 2.

Figure 3:
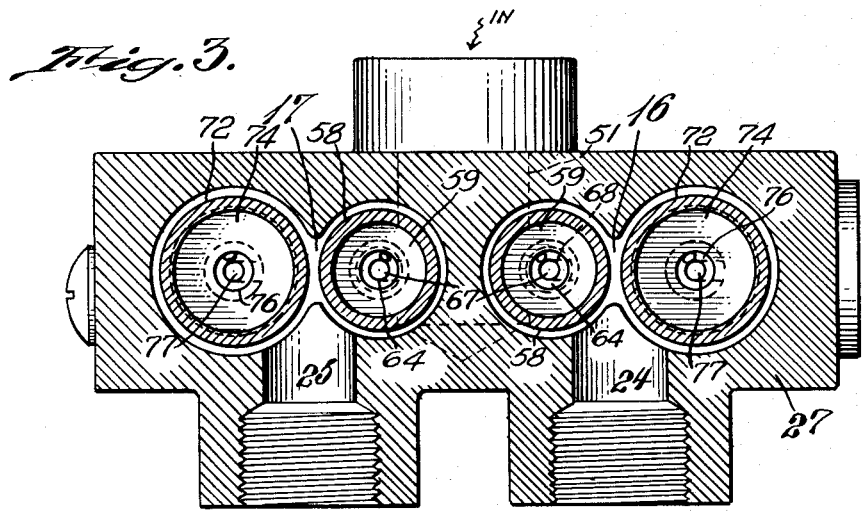
Fig. 3 is a section on line 3—3 of Fig. 1.

The general plan of the operation of this invention is best explained with reference to Fig. 6 wherein 10 designates a fluid reservoir and 11 a gear pump for drawing fluid from the reservoir to supply it to a cylinder 12 having a piston 13 therein. The fluid may be directed to the end 14 of the cylinder to move the piston to the left or directed to the end 15 of the cylinder to force the piston 13 to the right. In the event that fluid is forced in at 14 to move the piston to the left the valves are so arranged that fluid will be permitted to flow from the end 15 back to the supply reservoir. This result is accomplished by provision of chambers 16 and 17 to which fluid from the pump may be supplied, while from these chambers return conduits 18 and 19 extend back to the reservoir. The supply to the chambers 16 and 17 is controlled by valves 20 and 21 while the return from the chambers is controlled by the valves 22 and 23. The conduits 24 and 25 are always open from the chambers 16 and 17 to the cylinder ends 14 and 15. The valves 20 and 21 are arranged to operate oppositely, when one opens the other closes. Likewise the valves 22 and 23 are arranged to operate oppositely so that when one opens the other closes. Each pair of valves 20, 22 and 21, 23 operate oppositely so that when one opens the other closes. All four of the valves operate from the same control means. By this arrangement when the valve 20 opens liquid enters the chamber 16, thence through conduit 24 to the cylinder 12 at the end 14 to move the piston to the left. At the same time liquid on the opposite side of the piston is forced outwardly from the cylinder at the end 15 through the conduit 25 while the valve 23 opens so that the liquid may be forced back to the supply tank or reservoir. If it is desired to move the piston in the opposite direction the valve 20 is closed and 22 opened while valve 21 is opened and 23 is closed. In this case fluid will be forced from the chamber 17 through the conduit 25 to the end 15 of the cylinder to move the piston to the right which will force liquid out of the end 14 through the conduit 24 through the chamber 16 and thence through the open valve 22 back to the reservoir.

Figure 4:
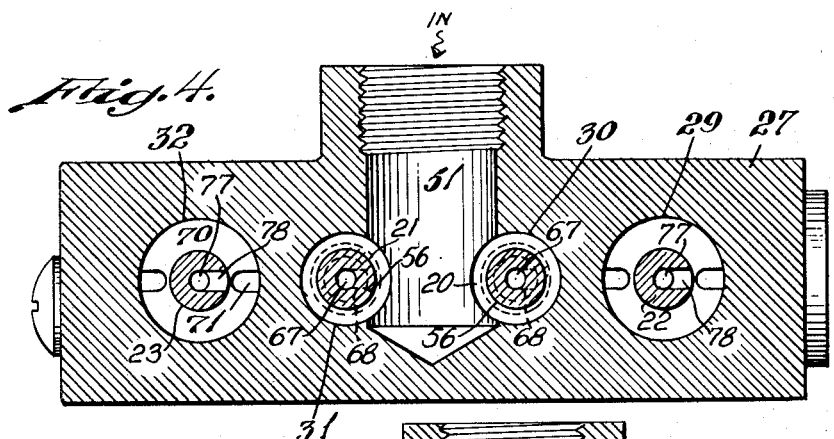
Fig. 4 is a section on line 4—4 of Fig. 1.
Figure 5:
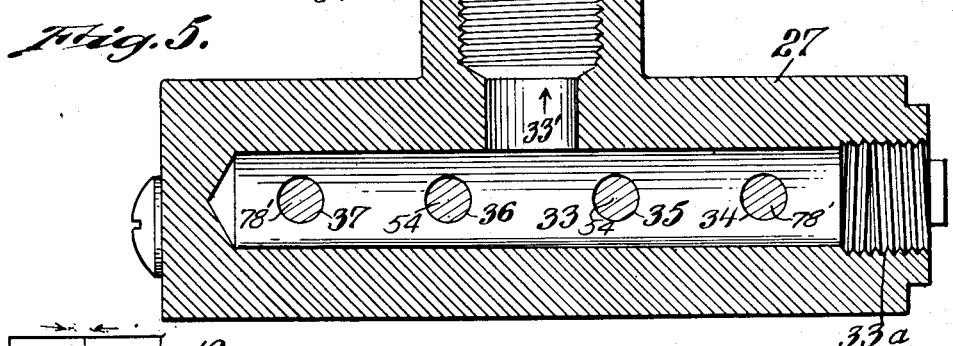
Fig. 5 is a section on line 5—5 of Fig. 1.

The device for housing these various valves comprises a body designated generally 26 (see Figs. 1, 3, 4 and 5) which is formed from a block 27 having four cylindrical bores therein designated 29, 30, 31 and 32 (see Fig. 4). The axes of these bores are parallel and are in the same plane. At the lower end of the block these bores are all connected by a common bore 33 as shown in Figs. 1 and 5. This bore 33 is closed at one end as at 33a and has an outlet from the valve body as at 33'. In line with each of the bores 29–32 inclusive there is provided smaller bores on the other side of the common conduit 33 which bores are designated 34, 35, 36 and 37 and extend out through the block 27. A companion block section 38 extends across the bottom of the block 27 and is provided with chambers 39, 40, 41 and 42 which connect with the bores 34–37 inclusive. A common conduit 43 connects the chambers 39 and 41 (see Figs. 2 and 7) while another common conduit 44 connects the chambers 40 and 42. These conduits 43 and 44 are formed by borings into the section 38 from the opposite ends thereof and are closed by screws having heads which form such closure and are designated respectively 45 and 46. In order to supply hydraulic operating fluid to the conduits 43 and 44, I provide threaded bores 47 and 48 which connect (not shown) with the supply lines to provide liquid pressure in one or the other as may be desired. At the upper end of the block 27 the chamber 16 is provided communicating with the upper ends of the bores 29 and 30 while a like chamber 17 is provided at the upper ends of the bores 31 and 32. A conduit 24 leads from the chamber 16 to one side of the piston 13 while a conduit 25 leads from the chamber 17 to the other side of the piston 13 as shown in Fig. 6. A pressure conduit 51 located substantially centrally of the valve communicates with the bores 30 and 31 and is directly supplied from the pump which draws from the supply reservoir.

The valves in the bores 30 and 31 are identical and serve to control the flow of fluid from the pressure conduit 51 to the conduits 24 and 25. The valve which controls the connection to the conduit 24 is designated 20 while the valve which controls the flow of liquid from 51 to 25 is designated generally 21.

Each of these valves comprises a body portion 52 which closely fits the bore in which it slides and is provided with a packing 53 so as to prevent the passage of fluid therealong. Below this body portion there extends a reduced end 54 which is provided with a packing 55 slidable in the smaller bore 35 or 36, this lower end 54 being exposed to the hydraulic pressure which is applied for operating the valve. Just above the body portion 52 there is a reduced stem 56 which permits the pressure fluid to surround this valve stem and will apply equal pressure tending to move the valve in opposite directions so as to balance the valve. The valve seat is designated 57 at the upper end of the bore 30 or 31 and is a very thin seat or line contact. The valve above the seat is enlarged as at 58 sufficiently so as to provide for the formation of a recess 59 in this enlarged portion which will be of a diameter substantially the diameter of the bore 30 or 31 in which the body of the valve slides. The valve body 20 is provided with a cover 50 for all of the bores of the body and projecting inwardly from the cover into the recess 59 of this valve there is a fixed member 60 which is provided with packings 61 to slide along the recess 59 and prevent the transfer of liquid along this surface. A screw 62 serves to retain this member 60 in position. A recess 63 is provided in the member 60 for the reception of a compression spring 64 which also seats into a recess 65 in the valve so as to hold the spring in desired alignment. This spring serves to press the valve to closed position.

By reason of the diameter of the recess 59 being the same as the diameter of the bore 30 or 31 in which the valve operates and the valve seat being substantially a line contact and this recess being closed at its top, I provide areas on the valve above the seat which are balanced so far as any pressure that may exist in either the chamber 16 or 17 in which the valve is located, while as previously explained the areas tending to move the valve in either axial direction below the seat are also balanced as to tendency to move the valve axially. Thus regardless of whether this valve is in open or closed position, the outside surface of the valve at the upper side of the body is in balance as to exposure to fluid pressure.

The under side of the body 52 is also exposed by reason of the surface 66 to pressure which may exist in the line for transferring of fluid back to the reservoir and in order that these pressures may be nearly balanced on the valve as to tendency for axial movement of the valve I have provided a conduit 67 extending axially of the valve and open as at 68 into the conduit 33. This conduit 67 also opens into the recess 59 of the valve and as this recess 59 is of a diameter the same as the diameter of the bore 30 or 31 the areas which are exposed to the pressure on this side of the valve are nearly in balance. Thus, although the valve works in two different media of fluid it is balanced as to one of the pressures and nearly balanced as to the other pressure at all times.

The valves in the bores 29 and 32 are duplicates, the valve in the bore 29 being designated 22 and the valve in the bore 32 being designated 23. These valves have a body portion 70 which has openings 71 through it (see Fig. 4) so that there may be flow of liquid throughout the length of the bore. The valve is provided with an enlarged head portion 72 and contacts with a seat 73 which is a line contact at the upper end of the bore, either 29 or 32. This valve, so far as its head construction is concerned, is substantially the same as the valve previously described, there being a recess 74 of the same diameter as the bore in which the body of the valve slides with a stud member 75 extending into the recess and with a spring 76 centered in recesses in the member and in the valve to urge the valve to closed position. By reason of this sizing of the recess and the closure member the outside surface of this valve above its seat where exposed to pressure in the chambers 16 and 17 is in balance. In this valve a conduit 77 communicates as at 78 with the bore 29 or 32 so as to transfer any fluid under pressure in the bore 29 or 32 to the recess 74 and thus balance the pressures in this part of the system tending to axially move the valve. As the body portion 70 has communication above and below it through the opening 71 the surfaces which it exposes to this same fluid medium are also in balance. The lower portion of this valve has a part 78' which extends into the bores 34 or 37 and is exposed to the pressure of the fluid in the chambers 39 and 42.

Figure 6:
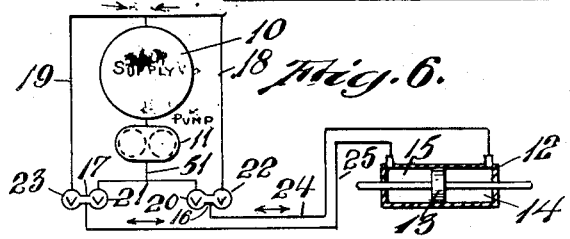
Fig. 6 is a diagrammatic view illustrating schematically the arrangement between the multiple valve unit herein described and the connection of the valve to a fluid reservoir and to the cylinder having a piston therein which is to be operated by the fluid from the reservoir.

It will be apparent that when pressure is applied to the chambers 39 and 41, the valves 21 and 22 will be opened as shown in Fig. 1, which will cause pressure to be supplied to the portion 15 of the cylinder to move the piston 13 to the right as shown in Fig. 6. When pressure is applied to the chambers 40 and 42 the pressure on the other two chambers 39 and 41 will be relieved by the use of suitable valves in the hydraulic system (not shown), the valves will move to closed position being under nearly balanced fluid pressure and urged by their springs and the valves 20 and 23 will be opened to supply liquid to the end 14 of the cylinder and move the piston 13 to the left. Thus by a control for applying pressure to the proper valve the cylinder may be hydraulically moved in one direction or the other.

The springs 76 will be weaker than the springs 64 so that equal pressure in conduit 43 or 44 will cause the exhaust valve to open prior to the inlet valve.

I claim:

1. In a valve, a body having a pair of spaced chambers each provided with a service conduit extending therefrom, an inlet port, separate conduits connecting said inlet port to each of said chambers, a valve for controlling each conduit, each of said valves having oppositely disposed equal pressure areas exposed to fluid pressures controlled by said valve, an exhaust port, a second set of separate conduits connecting said exhaust port to each of said chambers, a valve for controlling each of said second set of conduits, each of said valves having oppositely disposed equal pressure areas exposed to fluid pressures controlled by said valve, resilient means for each valve urging said valve to closed position, hydraulic means to effect opening of the inlet valve to one chamber and the exhaust valve from the other chamber, said exhaust valve resilient means being weaker than the inlet valve resilient means to cause the exhaust valve to open prior to the opening of the inlet valve when subjected to the action of said hydraulic means.

2. In a valve, a body having a bore enlarged at one end providing a valve seat, an inlet conduit communicating with said enlarged portion of said bore, an outlet from said bore, a valve slidable in said bore and provided with a head larger than said bore positioned in said enlarged portion and engageable with said valve seat to close the passage between said bore and said enlarged portion, said valve beneath said head having a pressure area exposed to fluid pressure tending to move said valve to open position, said head being provided with a recess having a diameter substantially the size of said bore on the other side of said seat, a stationary member slidably received in said recess to close the same at its upper end, a conduit through said valve connecting said recess with said portion beneath said head to expose said recess to the pressure of the system on one side of the valve seat, said head having equal oppositely disposed areas exposed to fluid pressure on the other side of said valve seat to balance the pressure of the system on the other side of said valve seat, and a spring urging said valve to closed position.

3. In a valve, a body having a bore enlarged at one end providing a valve seat and reduced at the other end thereof, an inlet conduit communicating with said enlarged portion of said bore, an outlet from said bore, a valve slidable in said bore and provided with a head larger than said bore positioned in said enlarged portion and engageable with said valve seat to close the passage between said bore and said enlarged portion, said valve beneath said head having a pressure area exposed to fluid pressure tending to move said valve to open position, said head being provided with a recess having a diameter substantially the size of said bore, a stationary member slidably received in said recess to close the same at its upper end, a conduit through said valve connecting said recess with said portion beneath said head to expose said recess to the pressure of the system on one side of the valve seat, said head having equal oppositely disposed areas exposed to fluid pressure on the other side of said valve seat to balance the pressure of the system on the other side of said valve seat, a plunger on said valve slidably received in said reduced end of said bore, hydraulic means engaging said plunger to move said valve to open position, and a spring urging said valve to closed position.

ROBERT STEVENSON.

REFERENCES CITED

The following references are of record in the file of this patent:

UNITED STATES PATENTS

| Number | Name | Date |
|---|---|---|
| 1,080,000 | Citroen | Dec. 2, 1913 |
| 2,294,702 | VanDerWerff | Sept. 1, 1942 |
| 2,376,918 | Hughes | May 29, 1945 |